United States Patent
Kasravi et al.

(10) Patent No.: US 10,986,089 B2
(45) Date of Patent: Apr. 20, 2021

(54) VIRTUAL MOBILE DEVICE SYSTEM AND METHOD THEREOF

(71) Applicants: Kas Kasravi, West Bloomfield, MI (US); Eric R. Holton, Belgrade, MT (US); James E. Lucari, Meadow Vista, CA (US); Don D. McCracken, Jr., Sacramento, CA (US); Cori B. Reading, Loomis, CA (US)

(72) Inventors: Kas Kasravi, West Bloomfield, MI (US); Eric R. Holton, Belgrade, MT (US); James E. Lucari, Meadow Vista, CA (US); Don D. McCracken, Jr., Sacramento, CA (US); Cori B. Reading, Loomis, CA (US)

( * ) Notice: Subject to any disclaimer, the term of this patent is extended or adjusted under 35 U.S.C. 154(b) by 264 days.

(21) Appl. No.: 16/382,121

(22) Filed: Apr. 11, 2019

(65) Prior Publication Data

US 2020/0329034 A1  Oct. 15, 2020

(51) Int. Cl.
*H04L 29/06* (2006.01)
*G06F 11/20* (2006.01)
*G06F 9/455* (2018.01)

(52) U.S. Cl.
CPC ...... *H04L 63/0861* (2013.01); *G06F 9/45558* (2013.01); *G06F 11/2023* (2013.01); *G06F 2009/45595* (2013.01); *G06F 2201/82* (2013.01)

(58) Field of Classification Search
CPC ............. H04L 63/0861; G06F 11/2023; G06F 11/2056; G06F 9/45558; G06F 9/455; G06F 2009/45595; G06F 2201/82
See application file for complete search history.

(56) References Cited

U.S. PATENT DOCUMENTS

| | | | |
|---|---|---|---|
| 8,117,314 B2 * | 2/2012 | Croft | G06F 3/1415 709/227 |
| 8,274,935 B2 | 9/2012 | Gidron et al. | |

(Continued)

*Primary Examiner* — Sarah Su

(57) ABSTRACT

A system and method are disclosed for virtual replication of a user's mobile device using a plurality of master and auxiliary host servers, a failover server, and connectivity to network and telephony, mobile voice and text services. According to one example embodiment, a user of a mobile device creates an account on the master host server via a mobile device application that uploads the data and settings of the mobile device to the master host server. The master host server via a master controller distributes the user data and settings among the plurality of the auxiliary host servers, where the user data and settings are combined into a mobile device image that is optionally compressed, mirrored, split, and stored in a plurality of storage facilities among the auxiliary host servers. Upon single or two-factor authentication, the user who no longer has access to their mobile device, accesses the host server via a client device's browser interface and gains access to the mobile device image via replication and hosting in an auxiliary host server optimally selected by the master host server. When the auxiliary host servers are unreachable, the user requests through a secondary channel for communication to the help facility that is a separately enabled process. The replicated mobile device images provide the user with access to the data and functionality of their original mobile device and the changes are stored in an updated mobile device image. Upon request by the user, the most recent version of the mobile device image is transferred to either the original mobile device for further use, or to a new mobile device in the event the user replaced the original.

21 Claims, 7 Drawing Sheets

(56) References Cited

U.S. PATENT DOCUMENTS

| | | | |
|---|---|---|---|
| 8,707,387 B2* | 4/2014 | Gasparini | H04L 63/08 |
| | | | 726/1 |
| 8,718,611 B2 | 5/2014 | Balasaygun et al. | |
| 9,128,882 B2 | 9/2015 | Williams | |
| 9,160,796 B2 | 10/2015 | Reeves et al. | |
| 9,380,456 B1 | 6/2016 | Lee et al. | |
| 9,436,822 B2 | 9/2016 | Ghosh et al. | |
| 9,480,039 B2 | 10/2016 | Kasravi | |
| 9,680,821 B2 | 6/2017 | Gilpin et al. | |
| 9,819,593 B1 | 11/2017 | Vetter et al. | |
| 9,883,394 B2 | 1/2018 | Kasravi et al. | |
| 2007/0021112 A1* | 1/2007 | Byrne | H04W 8/30 |
| | | | 455/419 |
| 2012/0072723 A1* | 3/2012 | Orsini | H04L 63/10 |
| | | | 713/165 |
| 2012/0278571 A1* | 11/2012 | Fleming | H04L 29/08 |
| | | | 711/162 |
| 2013/0041977 A1* | 2/2013 | Wakamiya | G06F 9/5077 |
| | | | 709/217 |
| 2015/0066844 A1* | 3/2015 | Yin | G06F 9/45558 |
| | | | 707/612 |
| 2015/0121479 A1* | 4/2015 | Nair | H04W 12/06 |
| | | | 726/4 |
| 2016/0378456 A1* | 12/2016 | Chai | G06F 8/65 |
| | | | 717/169 |
| 2017/0060705 A1* | 3/2017 | Sridhara | G06F 11/2069 |
| 2017/0109184 A1* | 4/2017 | Ramani | G06F 11/3034 |
| 2017/0346830 A1* | 11/2017 | Goldfarb | H04L 63/102 |
| 2018/0060103 A1* | 3/2018 | Tsirkin | G06F 9/45545 |
| 2018/0206060 A1* | 7/2018 | Yazdani | H04W 4/16 |
| 2019/0258551 A1* | 8/2019 | Cors | G06F 11/2038 |
| 2020/0004642 A1* | 1/2020 | Sun | G06F 11/1464 |
| 2020/0012506 A1* | 1/2020 | Novick | G06F 9/5077 |
| 2020/0092299 A1* | 3/2020 | Srinivasan | G06F 21/552 |
| 2020/0183800 A1* | 6/2020 | Lyu | G06F 11/2097 |
| 2020/0329034 A1* | 10/2020 | Kasravi | G06F 11/2038 |

\* cited by examiner

VIRTUAL MOBILE DEVICE SYSTEM AND METHOD THEREOF

BACKGROUND OF THE INVENTION

1. Field of the Invention

The present invention relates generally to virtualization of mobile computing devices, and specifically to replicating an inaccessible mobile device via plurality of host servers.

2. Background

Mobile devices facilitated through the use of laptops, smartphone, tablets, wrist watches and similar devices have become ubiquitous in today's society. Many users have become reliant on their mobile devices as the primary source for management of personal and business information including email, contacts, calendar, tasks, documents, applications, media, telephony and text messages. Consequently, the mobile device is often considered the hub of personal information and computing for countless users. Inaccessibility to one's mobile device is often a traumatic experience due to lost productivity from inaccessibility to needed programs, information, and functionality, in addition to the inaccessibility and possible loss of personal information stored on the mobile device. Whether the mobile devices are intentionally left behind, forgotten, or stolen, it leads to the same unpleasant outcomes. In yet other cases, access to mobile devices may be banned, such as by airlines or court rooms, with equally undesirable results.

It would be desirable to have a virtual system that provides a user with access to the data, applications, and settings of a physically inaccessible mobile device that provides the ability to perform the same personalized functionality and behavior as if the physical device were accessible. Furthermore, it would also be desirable to have a virtual system that authenticates, deactivates, and activates an inaccessible mobile device as the user desires. Still further, it would be desirable to have a virtual system that updates the changes made within the virtual system while the user is working with it so that the changes are manifested into the inaccessible physical device upon gaining access to the same. Yet further, it would be desirable to have a virtual system that is as fail-safe as possible to ensure reliability of services.

Therefore, there currently exists a need in the industry for a reliable and fail-safe system that provides a user personalized access to the data and functionality of a mobile device when such device is physically inaccessible.

SUMMARY OF THE INVENTION

The present invention advantageously fills the aforementioned deficiencies by providing a virtual mobile device system and method, which provides the user with virtual access to the data, applications, and settings of an inaccessible physical mobile device.

The present invention is a virtual system together with an associated computer process. The system is made up of the following components: a master host server having a plurality of user accounts, an authentication module, an online help facility, and a master controller, a plurality of auxiliary host servers each having a storage facility, a virtual image emulator, a hosting facility, a network facility, an auxiliary controller, and an auxiliary authentication module, a mobile device having a mobile device application, and user device data and settings; a client device having a browser interface, a user access request and a user access credential, provided by a user, and a mobile device image.

These components are related as follows: The master host server communicates with the mobile device in response to the user access request and the user access credential provided by the user from the mobile device while using the mobile device application, upon validation of the user access credential against the user's user account by the authentication module, subsequent to which the master host server collects the user device data and settings from the mobile device as requested by the access request; the master host server communicates with the plurality of auxiliary host servers and transfers the most recent user device data and settings to the plurality of auxiliary host servers where the user device data and settings are stored in the respective storage facility within the auxiliary host server as the mobile device image, which is optionally compressed. The auxiliary authentication module accesses the user accounts in the master host server for authentication.

The master host server communicates with the mobile device in response to the user access request and the user access credential provided by the user from the client device and upon validation of the user access credential against the user's user account by the authentication module, subsequent to which the master host server transfers control to the plurality of auxiliary host servers. The master controller and the plurality of auxiliary controllers facilitate the control and flow of data and executive functions among the master host server and the plurality of auxiliary host servers. Upon transfer of control to the plurality of auxiliary host servers and the user access request, the user's stored mobile device image is transferred to the respective virtual image emulator from the storage facility and hosted via the hosting facility, subsequent to which the user accesses the hosting facility via the browser interface of the client device.

The method of the computer process of the present invention includes the following steps: Authenticating the user via the user access request originated in the mobile device and the authentication module and the user account in the master host server. Collecting, via the master host server, the user device data and settings from the mobile device application in the mobile device and transferring the user device data and settings to the plurality of auxiliary host servers via the master controller operating in the master host server. Storing the user device data and settings with the plurality of auxiliary host servers as mobile device images via a plurality of auxiliary controllers in their respective auxiliary host servers and replicating the mobile device by emulating the mobile device image within the plurality of mobile device emulators in their respective auxiliary host servers upon receiving the user access request from the user from a plurality of client devices. Streaming the replicated mobile device via their respective auxiliary host servers, viewing the plurality of emulated mobile devices in the plurality of client devices via the plurality of browser interfaces operating on their respective client devices, and interacting with the plurality of emulated mobile devices in the client devices via the browser interfaces. Controlling the overall interaction and flow between the plurality of emulated mobile devices accessed via the plurality of browser interfaces by the plurality of the auxiliary controllers; and saving the last change made to the user device data and settings in its respective auxiliary host server.

The system of the present invention optionally has one or more of the following optional components: a failover master host server having identical and continuously synchronized content in parallel to the master host server, where the failover master host server replicates the functionality of the master host server when failed. The plurality of storage facilities in the auxiliary host servers maintaining identical content. A plurality of network service providers accessed by the plurality of the network facilities in the auxiliary host servers. The client device has a biometric sensor. The authentication module having a two-factor authentication using the biometric sensor by inspecting the user's biometric indicator. The mobile device is deactivated via the master controller and the mobile device application when a deactivation request is submitted by the user via the client device.

The method of the present invention optionally has one or more of the following steps: authenticating the user via the authentication module using a user access credential and two-factor authentication based on a second user access credential or a biometric indicator. Receiving a deactivation request from the user, and transferring via the auxiliary host server, the master host server, the mobile device application from the client device to the mobile device upon receiving the deactivation request. Connecting the user to an online help facility when the auxiliary host server is inaccessible. Logging the user access request and the deactivation request. Clearing the mobile device application and the browser interface from the client device upon disabling the client device. Taking over a failed master host server via a failover master host server. Mirroring the mobile device image on the plurality of auxiliary host servers, and optionally splitting the mobile device image on the plurality of auxiliary host servers for redundancy and data security. Taking over a failed auxiliary host server via an available auxiliary host server. Connecting the user to the online help facility when the master host server or the mobile device emulator is inaccessible.

The present invention system is unique when compared with other known systems and solutions in that it provides access to the personalized data, applications, and settings of a user's inaccessible and possibly inoperative physical mobile device. Further, the present invention updates the physical mobile device with the changes made to the virtual mobile device when the physical device becomes accessible. Still further, the present invention provides information security via user authentication, two-factor authentication, and mirroring and splitting the device images across multiple servers. Yet further, the present invention provides the user with online help and support if the master server or the device emulator are not accessible.

The present invention is unique in that the overall architecture of the system is different from other known systems. More specifically, the present invention system is unique due to the presence of: (1) provides access to the data and functionality of a mobile device when the mobile device is inaccessible for any reason, (2) provides a master server and a plurality of auxiliary servers, which provide optimal access experience to the user; (3) provides data security via user authentication and the mirroring and splitting of the mobile device images across multiple servers, (4) supports the user via online help if the system were unavailable.

Among other things, it is an objective of the present invention to provide virtual mobile device system and method thereof that does not suffer from any of the problems or deficiencies associated with prior solutions.

It is an also objective of the present invention to provide a user with access to the data and functionality of a physical mobile device when the device is not accessible or powered on. It is a further objective of the present invention to provide the user with access to an up-to-date virtual image of an inaccessible mobile device via a browser interface. It is still further an objective of the present invention to secure the user's data through the use of single and/or two factor authentications as well as mirroring and splitting the mobile device image across multiple host servers. Yet another objective is to ensure optimal user experience by providing online help when the system is inaccessible.

The present invention now will be described more fully hereinafter with reference to the accompanying drawings, which are intended to be read in conjunction with both this summary, the detailed description, and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

The present invention is directed to virtual mobile device system and method thereof.

Figure 1:
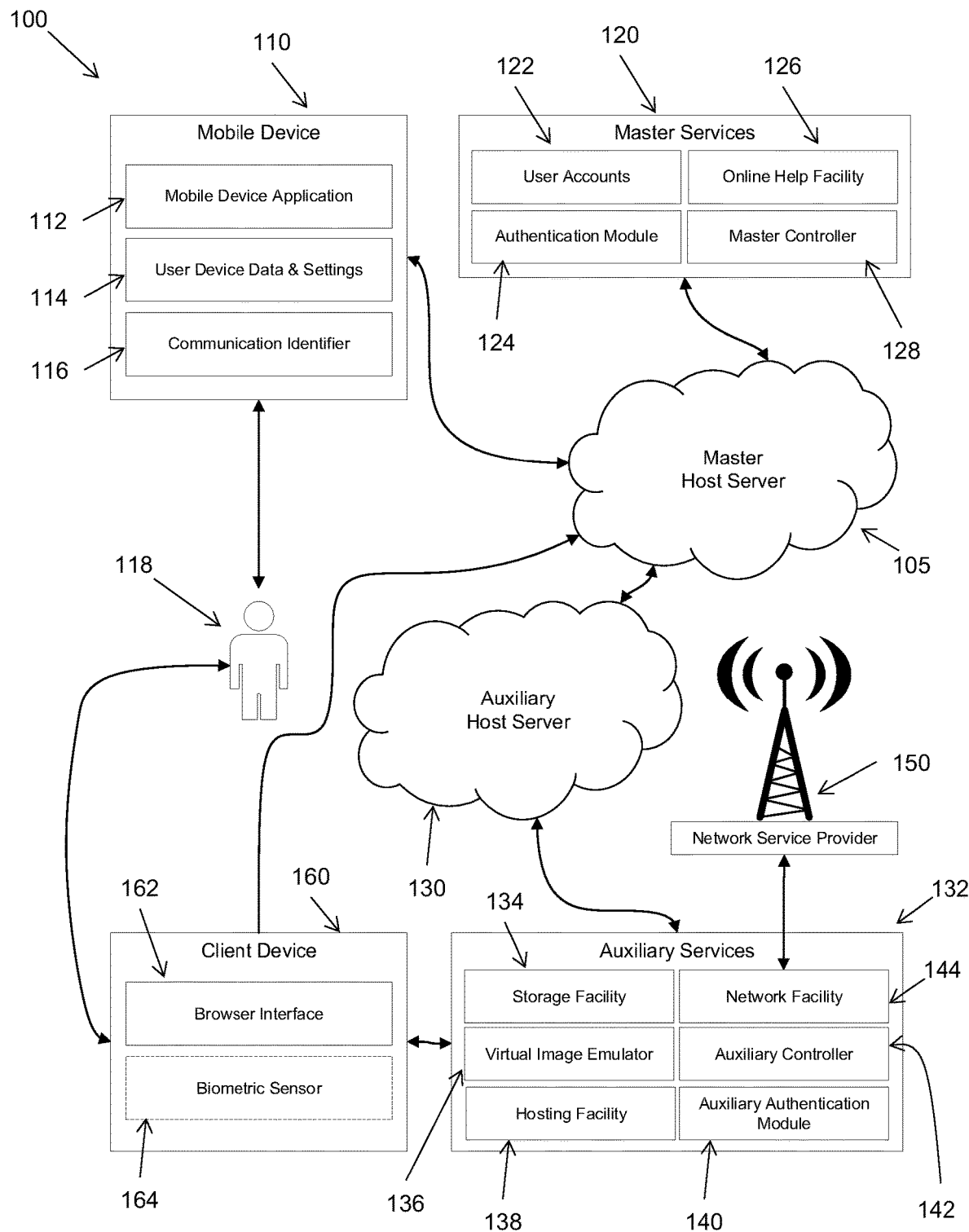
FIG. 1 illustrates the overall system architecture.

With reference to FIG. 1, a virtual mobile device system 100 comprises a master host server 105 that can be accessed online by a mobile device 110. The mobile device in the present invention is defined as any computing device that a user 118 can carry on oneself, including but not limited to a laptop, a tablet, a smart phone, and a wearable device. The mobile device 110 has a mobile device application 112, a user device data and settings 114, and a communication identifier 116. The mobile device application 112 is a software element in the mobile device 110 specifically designed to communicate and collaborate with the master host server 105. In the preferred embodiment of the present invention, the master host server 105 is a large-scale internet-connected computer system, commonly known as a cloud computer, that provides computing services to a large number of users and subsystems.

The user device data and settings 114 comprises all the data, settings, applications and any customization and personalization by the user 118 within the mobile device 110. The communication identifier 116 is an identifier that uniquely identifies the mobile device 110 for any communication and networking purposes.

The master host server 105 comprises a set of master services 120 such as a plurality of user accounts 122, an authentication module 124, an online help facility 126, and a master controller 128. A user account 122 is set up for an individual user 118, which captures information about the user 118 such as user name, password, biometric identifier, name, address, e-mail, phone number, user type, payment information, and any pertinent user information. Each user 118 is required to have a user account 122 to access and use the present invention. The authentication module 124 works in conjunction with the user account 122 and the authentication information provided by the user 118 via the mobile device 110 or other means to authenticate the user 118 and provide access to the services provided by the present invention. The online help facility 126 is an online help utility that is optionally automated or staffed to help the user 118. In the preferred embodiment of the present invention the user 118 is automatically directed to the online help facility 126 if the user 118 is unable to access the other services provided by the master host server 105. In the preferred embodiment of the present invention the online help facility 126 operates independent of the master host server 105, or the failover master host server 207, and is capable of performing its functions even if the master host servers 207 are available to the user. The master controller 128 provides flow control and executive functions to the master host server, thus guiding the activities of the user 118 within the master host server 105 as well as the interactions between the master host server 105 and other elements of the present invention. In the preferred embodiment of the present invention, the master controller 128 comprises a set of IF-THEN rules, also known as an expert system, and a set of software procedures to perform its functionality as described above.

The master host server 105 receives requests for services from the user 118 via the mobile device 110. Subsequently, the master host server 105 communicates with an auxiliary host server 130 to fulfill the request by the user 118. The auxiliary host server 130 comprises auxiliary services 132 such as a storage facility 134, a virtual image emulator 136, a hosting facility 138, an auxiliary authentication module 140, an auxiliary controller 142, and a network facility 144. The interactions and data flow between the master host server 105 and the auxiliary host server 130 are controlled via collaboration between the master controller 128 and auxiliary controller 142. In the preferred embodiment of the present invention, the auxiliary controller 142 comprises a set of IF-THEN rules, also known as an expert system, and a set of software procedures to perform its functionality as described above.

The storage facility 134 stores the user device data and settings 114 conveyed from the mobile device 110 and mobile device application 112 via the master host server 105 to the auxiliary host server 130. In the preferred embodiment of the present invention, the user device data and settings 114 is compressed and encrypted as a device image when stored in the storage facility 134.

The virtual image emulator 136 receives the device image from the storage facility 134, decompresses and decrypts the device image if needed, and emulates the mobile device 110 in a virtual manner within the auxiliary host server 130. The virtual image emulator contains a collection of the operating systems used by the mobile devices 110 and selects the appropriate operating system to emulate a specific device image to render a virtual emulation of the mobile device 110 as requested by the user 118. The device emulation performed by the virtual image emulator 136 is transferred to the hosting facility 138, which hosts the device image for an authenticated user 118. The auxiliary authentication module 140 works in conjunction with the authentication module 124 to authenticate the user 118 prior to the said hosting service. The network facility 144 connects the auxiliary host server 130 to a network service provider 150 for network and telephony services, which includes but not limited to the communication of data, voice, and text/multi-media messaging. The network facility 144 and the said network and telephony services use the communication identifier 116 from the mobile device 110 to provide access to network and telephony services unique to the mobile device 110.

The user 118 may be a new user or an existing user. If a new user, the user 118 initially uses the mobile device application 112 to connect to the master host server 105 via the mobile device 110 and create a new user account 122. Subsequently, the user device data and settings 114 are transferred to the storage facilities 134 for future use. Changes and updates to the user device data and settings 114 are continuously uploaded to the storage facility 134, such that the device image in the storage facility 134 is always current.

If an existing user, and when the mobile device 110 is inaccessible, the user 118 optionally starts a session by connecting to the master host server 105 via a client device 160. The client device 160 is any computing device accessible to the user 118 that provides a browser interface 162 and optionally a biometric sensor 164. The existing user requests access to the device image of an inaccessible mobile device 110, in which case the master controller 128 and the auxiliary controller 142 collaborate to initiate the emulation of the device image stored in the storage facility 134 via the virtual image emulator 136 to be hosted using the hosting facility 138. The hosted device image is subsequently presented to the user 118 via the interaction between the hosting facility 138 and the browser interface 162 in the client device 160. Such interaction is subject to positive authentication of the user 118 via the authentication module 124 and the auxiliary authentication module 140. In the preferred embodiment of the present invention, the authentication of the user 118 includes a two-factor authentication in the client device 160 via a secondary password or a biometric indicator detected by the biometric sensor 164. A finger print or a retina scan are exemplars of a biometric indicator. When required, network and telephony services are included in the hosted image via the network facility 144 and the network service provider 150. Thus, a replication of the user device data and settings is available to the user 118, who has the utility of accessing and using a virtual image of the mobile device 100 via the browser interface 162 or a client device 160, while the physical mobile device 110 is inaccessible to the user 118. Any changes made to the replication of the user device data and settings 114 is stored as an updated device image in the storage facility 134, until the user 118 ends the session.

The changes made to the device image in storage facility 134 are stored, and transferred back to the mobile device 110, or a substitute thereof, at the request of the user 118.

Figure 2:
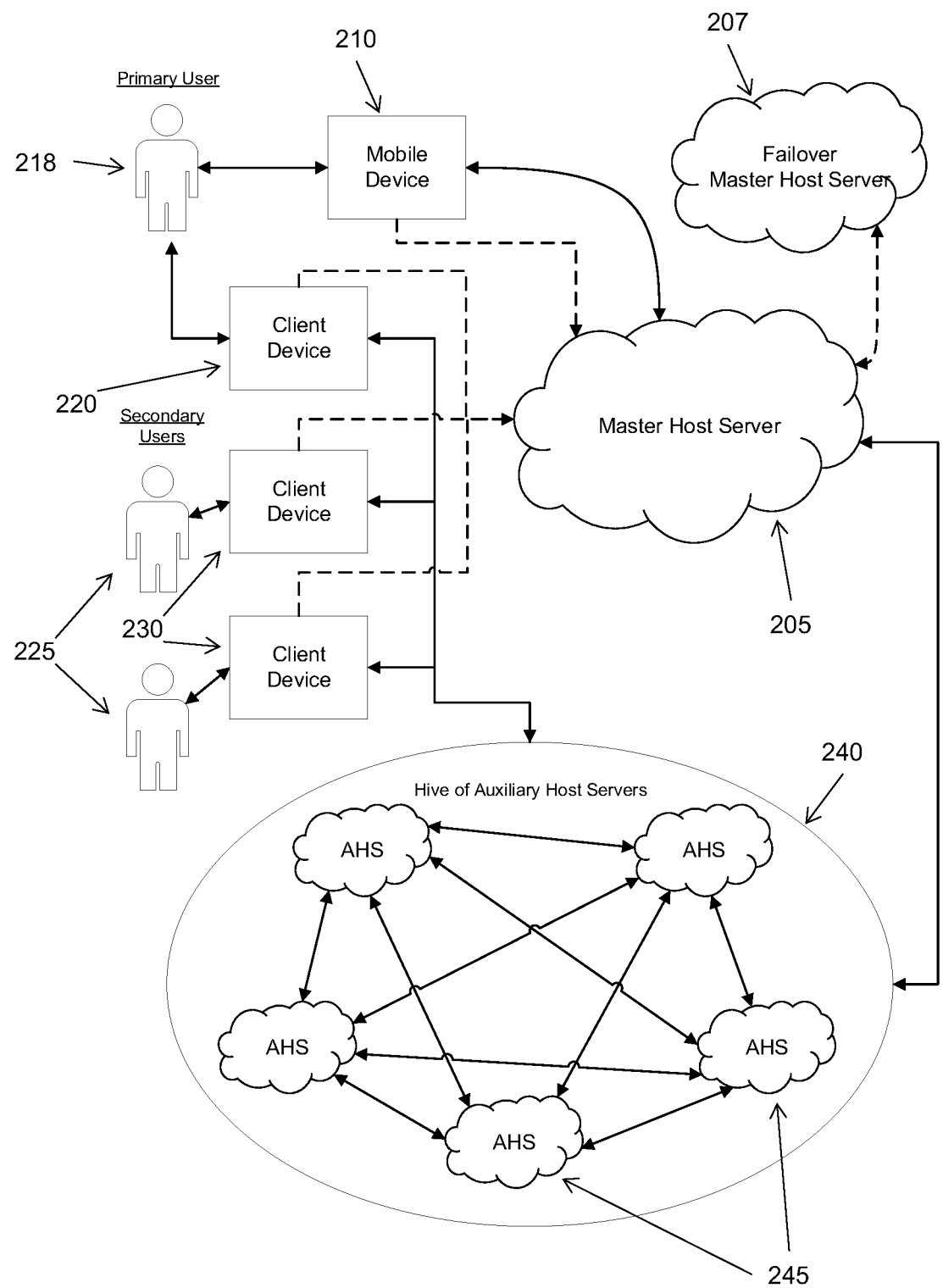
FIG. 2 illustrates the multi-server and multi-user interactions and the failover server.

As illustrated in FIG. 2, the master host server 205 has a failover master host server 207, where the latter is architecturally identical to the master host server 205. The failover master host server 207 is continuously kept in sync with the master host server 205 via interactions between the master controllers 128 of the two said servers. The purpose of the failover master host server 207 is to provide the users access to the services of the present invention if the master host server 205 fails. Thus, upon failure of the master host server 205 all user requests are routed to the failover master host server 207, which assumes the role and functionality of the failed master host server 205.

The user 118 may be a primary user 218 or a plurality of secondary users 225. The primary user 218 is the owner of the mobile device 210 who interacts with the master host server 205 and accesses a replicated image of an inaccessible mobile device 210 via a client device 220 as described earlier. The secondary users 225 are users authorized by the primary user 218 to access the replicated image of the mobile device 210 as a surrogate of the primary user 218. The authentication module 124 and the auxiliary authentication module 140 authenticate the secondary users 225 and control their scope of access to the replicated image of the mobile device 210 via additional client devices 230.

In the preferred embodiment of the present invention, a hive of auxiliary host servers 240 is provided consisting of a plurality of auxiliary host servers 245. All the auxiliary host servers 245 are identical in architecture. The data flow and control within the hive of auxiliary host servers 240 and the master host server 205 are governed by the interactions among the master controller 128 and the plurality of auxiliary controllers 142 within the plurality of the auxiliary host servers 245, where AHS in FIG. 2 is an abbreviation of auxiliary host server.

The content of the storage facilities 134 within the hive of auxiliary host servers 240 are kept in sync by the interaction of the auxiliary master controller 142 within each auxiliary host server 245. Thus, the device images in the plurality of the storage facilities 134 in the said hive are mirrored across the plurality of the said auxiliary host servers for redundancy and prevention of data loss. Further, the device images are split across the plurality of the storage facilities 134 for added security and privacy in case of an intrusion. Thus, accessing the device image of a particular mobile device 210 shall require a coordinated access to a plurality of the said storage devices such that a complete device image could be compiled for the session. The coordination of the said split device images is managed via coordination among the auxiliary controllers 142 within the said auxiliary host servers 245 inside the said hive of auxiliary host servers 240.

In the preferred embodiment of the present invention, upon receiving a user request from a client device 220 or 230, the master controller 128 of the master host server 205 determines the optimal auxiliary host servers 245 to respond to the user request by considering factors such as location, distance to server, server loads and other factors that positively impact the system performance and the user experience.

Figure 3:
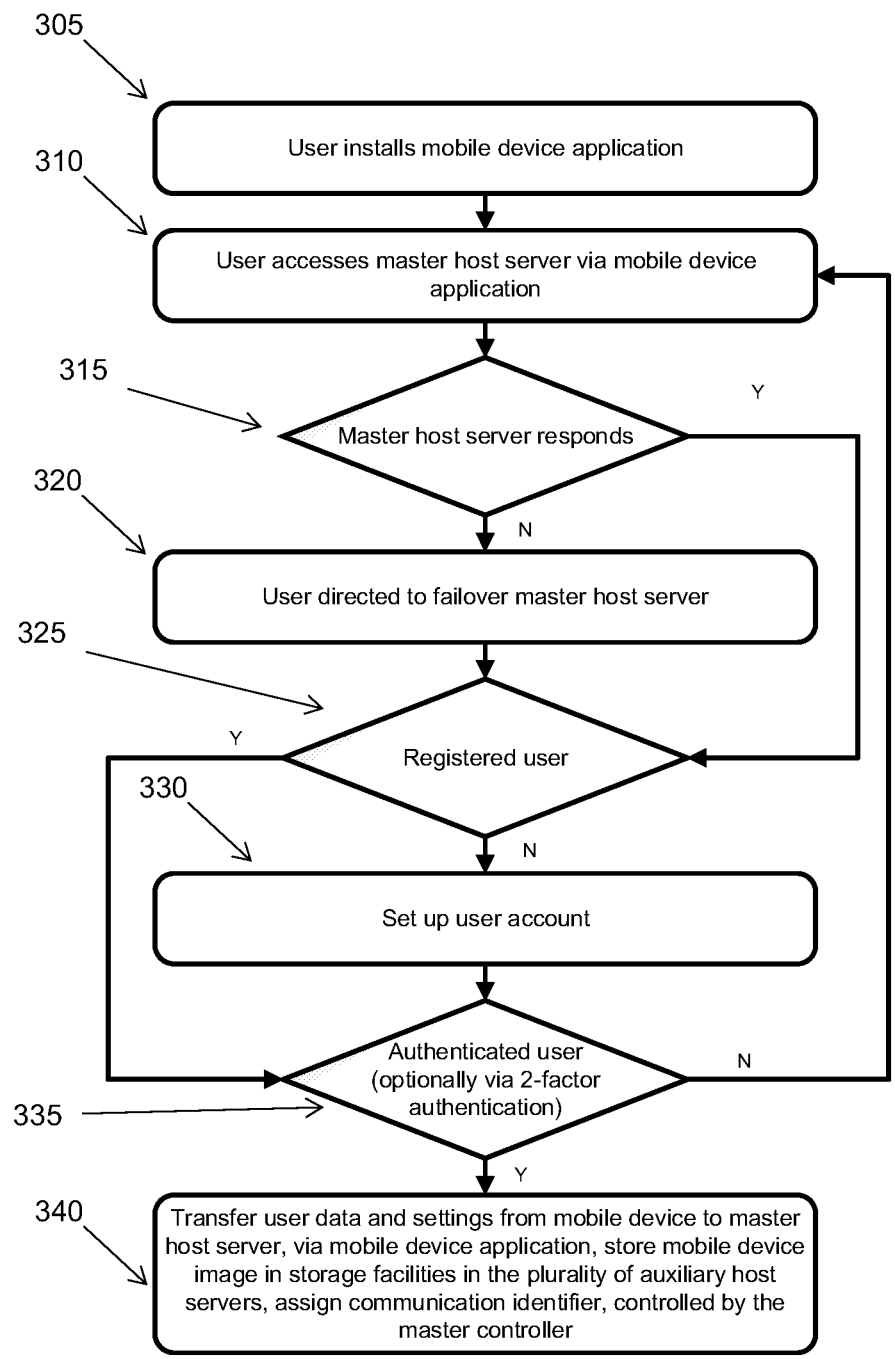
FIG. 3 illustrates the method for the initial access to the system, creation of user account, user authentication, and mobile device data upload to the system.

FIGS. 3-7 illustrate the methods for using the system of the present invention. FIG. 3 is a simplified flow chart of the processing steps for a user to access the system of the present invention when the user's mobile device is accessible. In step 305 the user installs a mobile device application on their mobile device, where the mobile device application is an element of the present invention and designed to interact with the system of the present invention. Next, in step 310 the user accesses the master host server via the mobile device application. Step 315 checks to determine if the master host server is available; if so, the user is directed to the master host server, otherwise step 320 directs the user to the failover master host server. All subsequent references to accessing the master host server also imply that a failover master host server is accessed, if necessary, and the failover master host server provides the same services as the master host server. The information in a failover master host server is transferred to the master host server when the latter comes back online. Subsequently, step 325 checks the user's credentials to determine if the user is already registered; if so, the user is directed to step 335 for authentication, otherwise the user is directed to step 330 for creating a new user account. Step 330 creates new user account by asking the user to provide pertinent account information, including but not limited to a username, full name, address, e-mail address, phone number, payment information, verification information, mobile device type, and the number of mobile devices to register. In step 335 the user's credentials are checked for validity, and upon validation the user is directed to step 340 for data transfer. Step 335 optionally uses two-factor authentication as an added security step, where the second factor is any method such as verification information, a second password, or a biometric indicator such as a finger print or retina scan. The utility of step 340 is to transfer and maintain an identical image of the mobile device on at least one auxiliary host server. Step 340 uploads the user's data and settings from the mobile device to the master host server or the failover master host server. During the initial phase all the user's data and settings are transferred, but in subsequent uses only the changes since the last transfer are uploaded. Also, in step 340 the master host server via master controller further transfers the user data and settings to the plurality of the auxiliary host servers for storage in the storage facilities as the device image, which optionally involves compression and/or encryption of the user data and settings.

Figure 4:
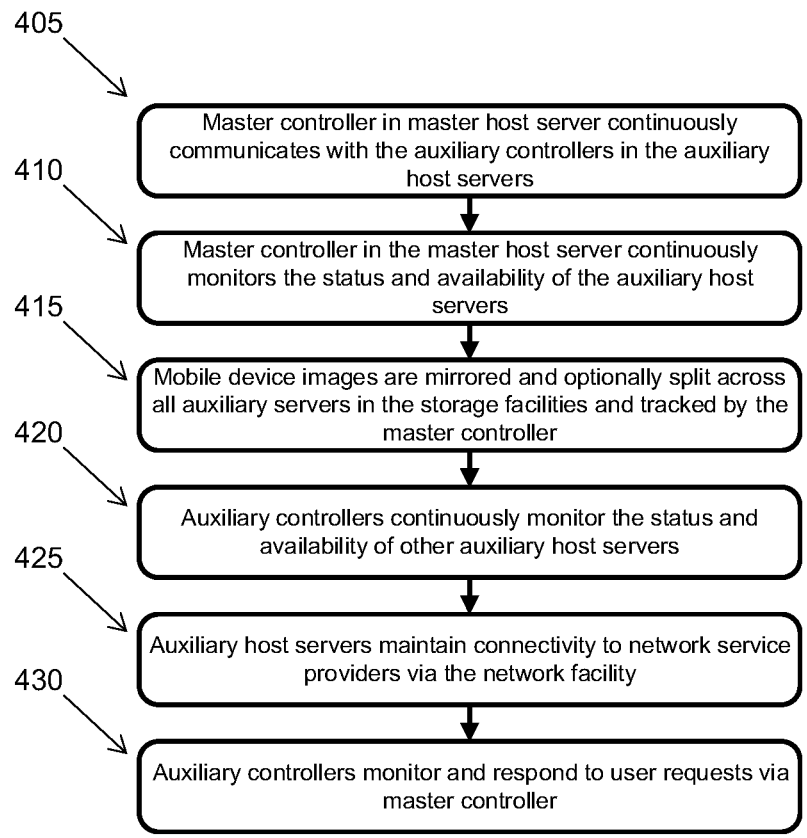
FIG. 4 illustrates the method for interactions among the master host server and the plurality of auxiliary host servers.

FIG. 4 is a simplified flow chart of the processing steps involving monitoring, communication, and collaboration between the master host server and the plurality of auxiliary host servers. In step 405 the master controller in the master host server continuously monitors and communicates with all the available auxiliary controllers in the auxiliary host servers. Next, in step 410 the master controller continuously monitors the availability status of the auxiliary host servers via their respective auxiliary controllers. Step 415 mirrors and optionally splits the mobile device images across all auxiliary server's storage facilities. This step is completed via coordination between the master controller and the respective auxiliary controllers. In step 420 the auxiliary controllers continuously monitor the status and availability other auxiliary host servers via communicating with the available auxiliary controllers of the respective auxiliary host servers. In step 425 the auxiliary host servers also monitor and maintain connectivity with their respective network service providers via the network facilities of the respective auxiliary host server. Thus, the availability of the network services to each auxiliary host server is continuously monitored. In step 430 the auxiliary controllers monitor user requests via the master controller and respond to the user request by making the plurality of the respective auxiliary services available to the user. For example, upon request from the user, the mobile device image is updated or emulated and hosted, and internet and voice communications are also made available via the network facility.

Figure 5:
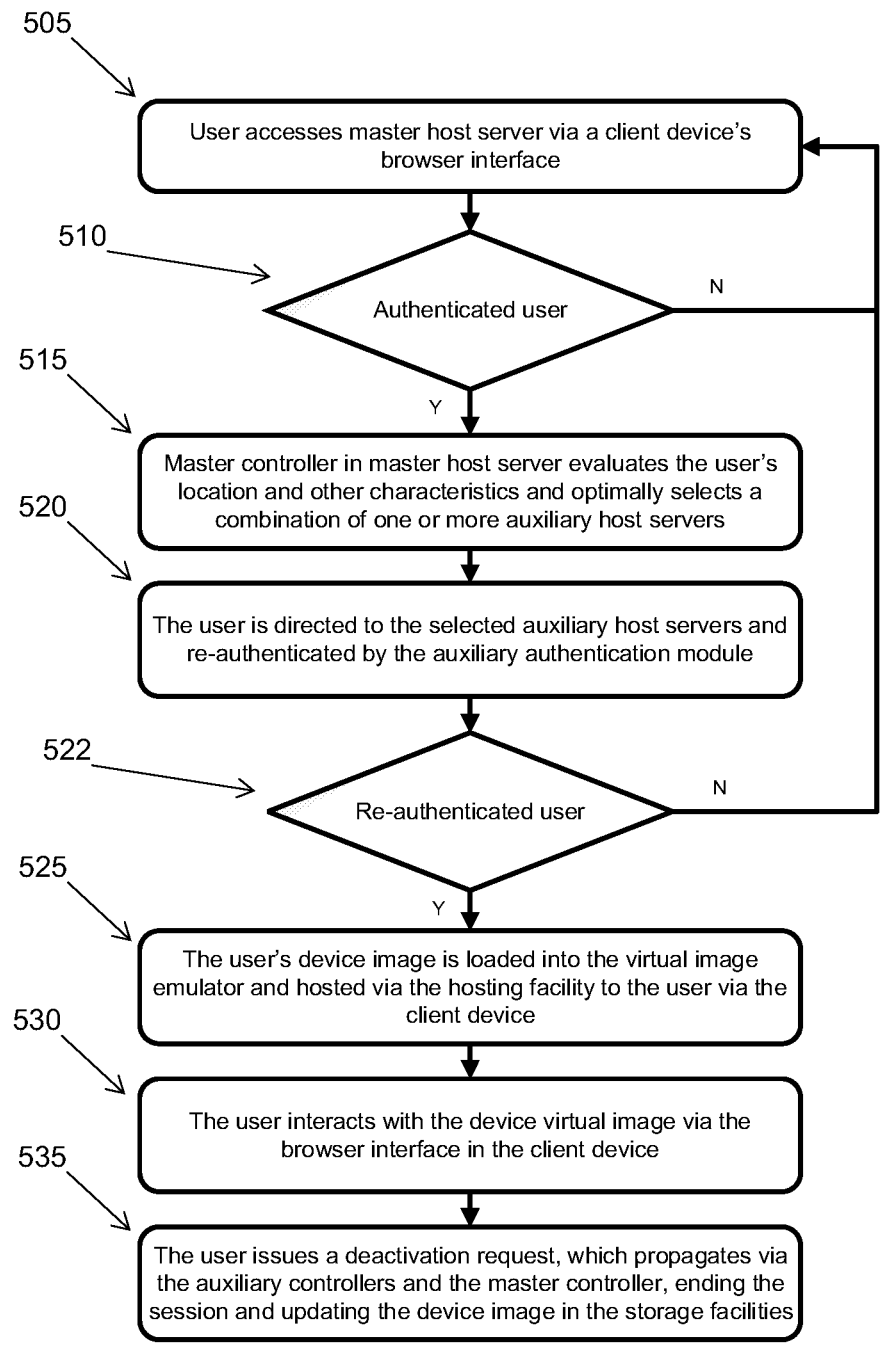
FIG. 5 illustrates the method for user interaction with the auxiliary host servers, device image emulation, hosting, and closing the session.

FIG. 5 is a simplified flow chart of the processing steps for a user to access the system of the present invention when the user's mobile device is inaccessible. In step 505, the user accesses the master host server via the browser interface of a client device. Step 510 authenticates the user, which involves the user providing a valid user identification and password, and optionally using two-factor authentication as an added security step, where the second factor is any method such as verification information, a second password, or a biometric indicator such as a finger print or retina scan. If the user authentication in step 510 is successful, in step 515 the master controller in the master host server evaluates the user's current location and other characteristics, such as operating system of the client device, and optimally selects a combination of one or more auxiliary host servers that can provide the optimal speed and quality of service to the user. In step 520, the user is directed to the optimal auxiliary host server(s), as selected by the master controller in the previous step, and the user is re-authenticated in step 522 by the authentication module(s) in the auxiliary host server(s). If the re-authentication fails the user is returned to step 505, otherwise the user proceeds to the next step. Next, in step 525 the user's device image is retrieved from the storage facilities, loaded into the virtual image emulators, and hosted by the hosting facilities of the selected auxiliary host servers. Optionally, the user may have multiple devices registered in the present invention, in which case the user is provided the option to select the preferred device image. In step 530, the hosted mobile device image is accessed by the user within the browser interface of the client device, where the user interacts with a virtual replication of the mobile device within the browser and perform common tasks such as looking up information, reviewing and editing documents and e-mails, sending and receiving text messages, making and receiving phone calls, browsing the internet, and using games or other apps available on the user's mobile device. In step 535, the user issues a deactivation request upon completion of the intended tasks. The deactivation request is propagated via the auxiliary controllers and the master controller, ending the aforementioned session and updating the device images in the storage facilities with the changes made during the session. Optionally, a log of the user activities is recorded and stored by the master host server. No record of the activities performed by the user is made or stored on the client device.

Figure 6:
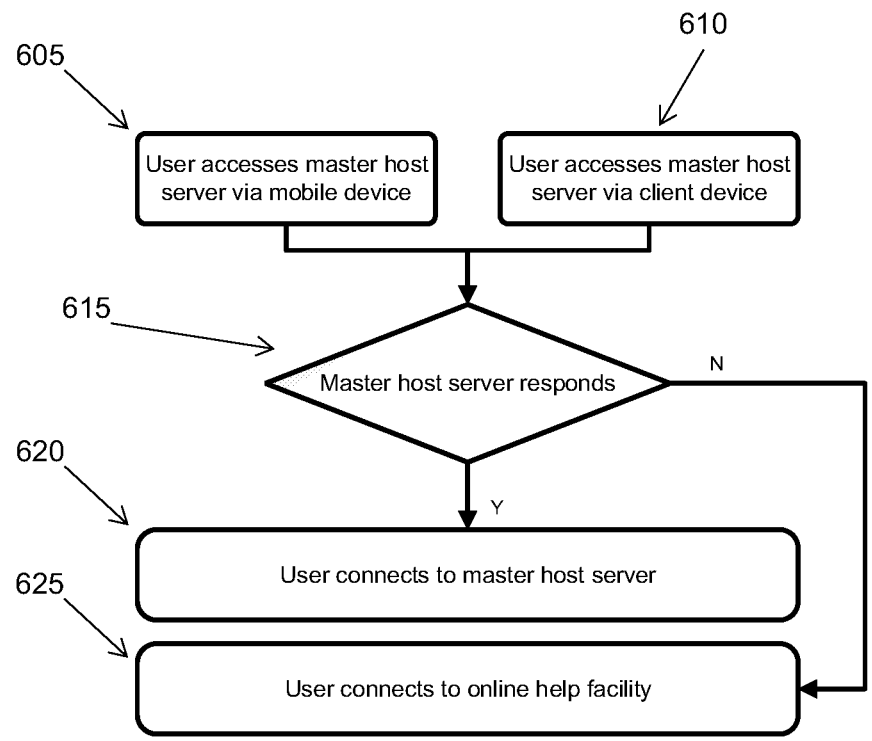
FIG. 6 illustrates the method for user access to the online help facility.

FIG. 6 illustrates the processing steps for a user accessing the online help facility, if needed. In step 605 the user attempts to access the master host server via the mobile device. In step 610 the user attempts to access the master host server via the browser interface of a client device. Step 615 responds to the user's attempts to access the master host server in steps 605 and/or 610, where the master host server either responds to the user or not. If the master host server does not respond, the present invention directs the user to step 625, where user is connected to the online help facility. The online help facility is a server based utility that operates independent of the master host server. The online help facility is an automated module, or operated by a human, or a combination of the two. The online help facility in step 625 assists the user to resolve any connection or technical problems and gain access to a master host server. If the access to the master host server in step 615 is successful, the user is directed to step 620, where the user is connected to a master host server, followed by the processes outlined in FIGS. 3 and/or 5.

Figure 7:
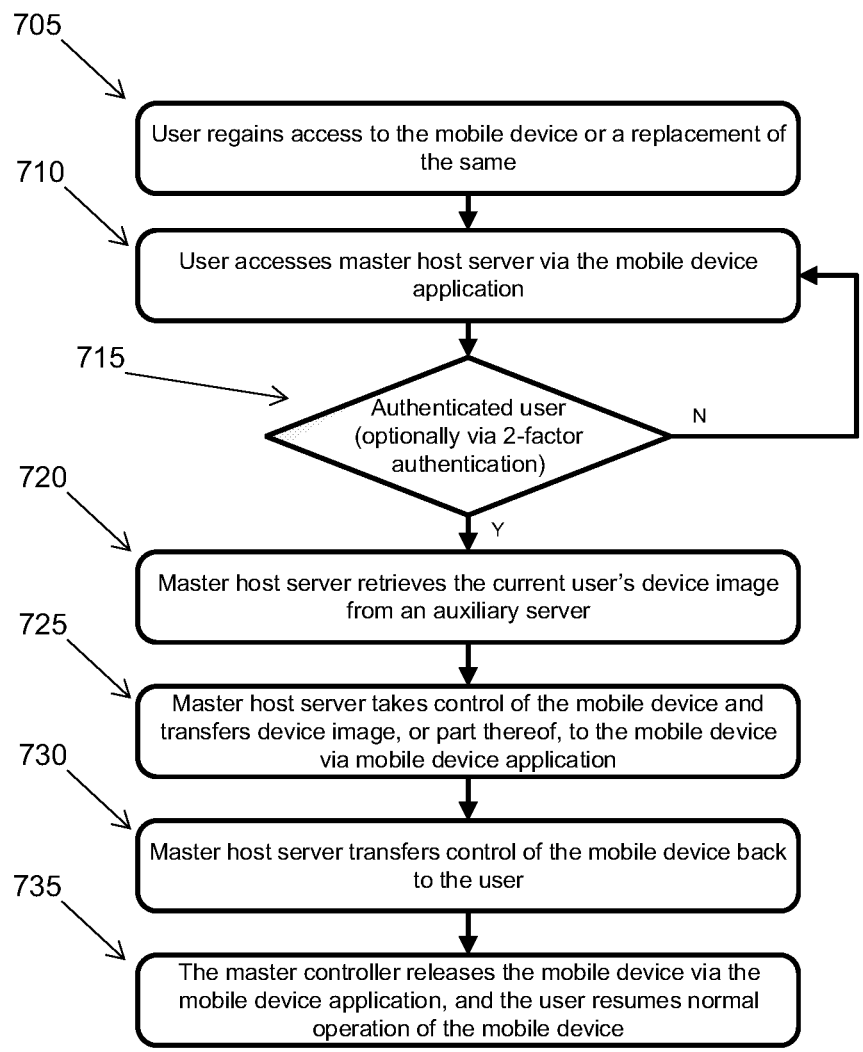
FIG. 7 illustrates the method for user to transfer the virtual image to a physical mobile device.

FIG. 7 is a simplified flow chart of the processing steps for a user to update a recovered mobile device or a replacement mobile device with the latest version of the device image in the present invention. In this context, an original mobile device is the mobile device that the user owned prior to the inaccessibility of the device, and a new device is a replacement for the original device after it became inaccessible. The process described in FIG. 5 could result in changes to the device image, which will be different than the user data and settings in the original mobile device. In step 705, the user regains access to the previously inaccessible mobile device or obtains a replacement for a damaged, lost, or stolen mobile device. In step 710, the user installs and personalizes the mobile device application of the present invention and subsequently accesses the master host server. In step 715, the user is authenticated by the master host server, optionally using two-factor authentication as described earlier. If unsuccessful, the user is returned to step 705. If the user authentication in step 715 is successful, the user is directed to step 720. In step 720, the master controller in the master host server locates and retrieves the latest version of the device image associated with the user's mobile device. The device image is optionally decompressed and/or decrypted, if necessary. Next, in step 725 the master controller takes control of the mobile device and transfers the device image to the mobile device by updating the user data and settings. The extent of the information transferred from the device image to the mobile device directly depends on the closeness between the make, model, and the operating system of the original device as compared to the new device. Step 730 continues until the current mobile device is updated with the information in the device image. In step 735, the master controller releases the mobile device via the mobile device application, control of the mobile device is returned to the user, and the user resumes normal operation of the mobile device.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. A virtual mobile device system comprising: a master host server having a plurality of user accounts, an authentication module, and a master controller; a plurality of auxiliary host servers each having a storage facility, a virtual image emulator, a hosting facility, a network facility, an auxiliary controller, and an auxiliary authentication module, where the auxiliary authentication module accesses the user accounts in the master host server; a mobile device having a mobile device application, and user device data and settings; a client device having a browser interface; the master host server communicates with the mobile device in response to a user access request and a user access credential provided by a user from the mobile device and upon validation of the user access credential against the user's user account by the authentication module, subsequent to which the master host server collects the user device data and settings from the mobile device as requested by the access request; the master host server communicates with the plurality of auxiliary host servers and transfers the user device data and settings to the plurality of auxiliary host servers where the user device data and settings are stored in the respective storage facility within the auxiliary host server; the user device data and settings stored in a storage facility is a mobile device image; the master host server communicates with the mobile device in response to the user access request and the user access credential provided by the user from the client device and upon validation of the user access credential against the user's user account by the authentication module, subsequent to which the master host server transfers control to the plurality of auxiliary host servers; the master controller and the plurality of auxiliary controllers facilitate the control and flow of data and executive functions among the master host server and the plurality of auxiliary host servers; upon transfer of control to the plurality of auxiliary host servers and the user access request, the user's stored mobile device image is transferred to the respective virtual image emulator from the storage facility and hosted via the hosting facility, subsequent to which the user accesses the hosting facility via the browser interface of the client device.

2. The method of claim 1 further comprising: a failover master host server having identical and continuously synchronized content in parallel to the master host server, where the failover master host server replicates the functionality of the master host server when failed.

3. The method of claim 1 further comprising: the plurality of storage facilities in the auxiliary host servers maintaining identical content.

4. The method of claim 1 further comprising: the plurality of the network facilities in the auxiliary host servers access a plurality of network service providers.

5. The method of claim 1 further comprising: the client device has a biometric sensor.

6. The method of claim 5 further comprising: the authentication module performs two-factor authentication using the biometric sensor by inspecting the user's biometric indicator.

7. The method of claim 1 further comprising: the mobile device is deactivated via the master controller and the mobile device application when a deactivation request is submitted by the user via the client device.

8. The method of claim 1 further comprising: an online help facility.

9. A virtual mobile device method comprising: authenticating a user via a user access request originating in a mobile device and an authentication module and a user account in a master host server; collecting, via the master host server, a user device data and settings from a mobile device application in the mobile device; transferring the user device data and settings to a plurality of auxiliary host servers via a master controller operating in the master host server; storing the user device data and settings with the plurality of auxiliary host servers as mobile device images via a plurality of auxiliary controllers in their respective auxiliary host servers; replicating the mobile device by emulating the mobile device image within a plurality of mobile device emulators in their respective auxiliary host servers upon receiving the user access request from the user from a plurality of client devices, and streaming the replicated mobile device via their respective auxiliary host servers; viewing the plurality of emulated mobile devices in the plurality of client devices via a plurality of browser interfaces operating on their respective client devices; interacting with the plurality of emulated mobile devices in the client devices via the browser interfaces; controlling the overall interaction and flow between the plurality of emulated mobile devices accessed via the plurality of browser interfaces by the plurality of the auxiliary controllers; and saving the last change made to the user device data and settings in its respective auxiliary host server.

10. The method of claim 9, further comprising: authenticating the user via the authentication module using a user access credential.

11. The method of claim 10, further comprising: authenticating the user via a two-factor authentication.

12. The method of claim 11, further comprising: authenticating the user via the two-factor authentication based on a second user access credential.

13. The method of claim 11, further comprising: authenticating the user via the two-factor authentication based on a biometric indicator.

14. The method of claim 10, further comprising: receiving a deactivation request from the user; and transferring, via the auxiliary host server, the master host server, the mobile device application from the client device to the mobile device upon receiving the deactivation request.

15. The method of claim 10, further comprising: connecting the user to an online help facility when the auxiliary host server is inaccessible.

16. The method of claim 10, further comprising: logging the user access request and the deactivation request.

17. The method of claim 10, further comprising: clearing the mobile device application and the browser interface from the client device upon disabling the client device.

18. The method of claim 10, further comprising: taking over a failed master host server via a failover master host server.

19. The method of claim 18 further comprising: splitting the mobile device image on the plurality of auxiliary host servers.

20. The method of claim 10, further comprising: mirroring the mobile device image on the plurality of auxiliary host servers.

21. The method of claim 20 further comprising: taking over a failed auxiliary host server via an available auxiliary host server.

* * * * *